UNITED STATES PATENT OFFICE.

G. LEWIS MERRILL AND OSCAR F. SOULE, OF SYRACUSE, NEW YORK.

IMPROVEMENT IN PRESERVING CORN AND OTHER VEGETABLES.

Specification forming part of Letters Patent No. 149,503, dated April 7, 1874; application filed December 24, 1873.

*To all whom it may concern:*

Be it known that we, G. LEWIS MERRILL and OSCAR F. SOULE, of the city of Syracuse, in the county of Onondaga and State of New York, have invented a new and Improved Method of Treating Green Corn and other Vegetables by Steam; and we do hereby declare that the following is a full, clear, and exact description of the same.

In all processes for preserving green corn, it seems to be necessary to twice subject it to the operation of heat. By the first operation the corn should be cooked sufficiently for present use, and, as we suppose, this also brings out the starch and fixes the juices. If the first cooking has been done in cans, they must then be punctured to let off the deleterious gases, and again sealed before the second application of heat.

Experience has also shown that, if not absolutely necessary for its preservation, it is far better to apply heat to the corn a second time in hermetically-sealed cans.

For performing the first operation of cooking, bringing out the starch, and fixing the juices, we pursue substantially the following method: The corn is taken from the cob in any ordinary manner, and placed in bulk in a steam-chamber, which may be closed after being filled, and readily made steam-tight or nearly so. For facility in working it is better to use two steam-chambers, so that the canning of cooked corn can proceed from one while the cooking is going on in the other. The size of the vessels for convenient working should be sufficient to hold about twenty gallons, more or less, and they may be in any shape that will be best adapted to receiving the corn, taking it out for canning, and also for receiving the steam. For the above-sized vessel there should be about four perforated steam-pipes running through the mass of corn in the vessel, so that a full supply of steam can be applied directly to the corn in the steam-chamber and permeate to all parts of it.

The whole of this first operation of cooking is performed by the direct application of steam into the cooking-chamber, and causing it to permeate, as above stated, without any outside application of either steam or other heat, and the time necessary to complete this cooking will be about one hour, more or less, to be determined by the judgment of the operator.

The corn is then placed in hermetically-sealed cans, in any ordinary manner, when it is ready for the second operation of cooking in the cans. To effect this purpose, we make a steam-chamber of any convenient form, and of sufficient size to hold for convenience about three hundred cans. It should be made of suitable metal for strength, and steam-tight. A cover is made to fit tightly upon the top of the chamber with suitable packing to make a steam-tight joint between the parts. The cover may be keyed down or held in any convenient manner. Inasmuch as green corn in cans will not bear a higher degree of heat than about 240° Fahrenheit without burning, a thermometer or steam-gage should be attached to indicate the degree of heat; also, an injection-pipe for the admission of steam, and an ejection-pipe for the condensed steam. In order to secure safety, the parts should be made strong enough to bear a steam-pressure of at least fifty pounds to the square inch. This latter part of our invention is more particularly intended to complete the preservation, in the shortest possible time, of green corn and other vegetables, which have already been treated by steam before being placed in the cans, as shown in Letters Patent granted to us, dated December 16, 1873, and numbered 145,581, or according to the above-described process of cooking in bulk.

The most common method now in use for preserving green corn and other vegetables consists in boiling the hermetically-sealed cans in water heated in any ordinary manner, or in water heated by steam, or in applying steam of about 212° Fahrenheit of heat, but of no more pressure than about that of the atmosphere. This process requires a long time for working, and is laborious and expensive. It being understood that the degree of heat by boiling would vary according to the weight of the atmosphere, and that the degree of heat from steam when not confined was the same as that of boiling water—to wit, about 212° Fahrenheit—other means have been tried to raise the heat by adding salt and various chemical compounds to the water. By this means the degree of heat has been raised to from 228° to 240° Fahrenheit, which latter is the desirable point to be reached. The objection to this last method is, that the required heat cannot be obtained without bursting the cans, and neither of the methods above referred to furnishes any more outside resistance to the inside pressure upon the cans than the ordinary pressure of the atmosphere. But by our new process of placing the cans hermetically sealed in a steam-tight chamber and applying and confining the steam in the chamber, as above described, we easily attain the requisite degree of heat, (240° Fahrenheit,) and such steam, also, affords an outside pressure upon the cans nearly equal to that from the inside, and they are thus saved from bursting.

The manner of working is substantially as follows: After the cans are properly sealed, they are thrown promiscuously into the steam-chamber, so as to afford a free circulation of steam. The cover is securely fastened and made steam-tight. The steam is then applied until the sufficient pressure is obtained to produce the required heat, to wit, about 240° Fahrenheit. To regulate the same according to the thermometer, the operator must manage the valve in the feed-pipe so as to keep the steam as near that degree of heat as possible. When the corn has been sufficiently cooked for preservation, the pressure of steam is gradually let off by allowing the steam to escape through the ejection-pipe.

When the corn has been treated by either of our processes above referred to before being placed in the cans, the time for steaming in the cans will be about forty-five minutes.

We do not claim, broadly, the cooking of fruits and vegetables in cans by subjecting them to steam-heat under pressure in a closed chamber; but

What we claim as our invention, and desire to secure by Letters Patent, is—

The above-described method of first cooking green corn and other vegetables in bulk in a steam-chamber by a direct application of steam into the chamber, then placing the cooked material in cans hermetically sealed, and again subjecting the same to heat in the cans in another steam-tight chamber at about the temperature stated (240° Fahrenheit) to complete the operation, substantially as set forth.

G. LEWIS MERRILL.
OSCAR F. SOULE.

Witnesses:
N. B. SMITH,
C. W. SMITH.